United States Patent
Arnold et al.

[19]

[11] Patent Number: 5,839,516
[45] Date of Patent: Nov. 24, 1998

[54] FOLDING FRAME ASSEMBLY FOR A ROLLING HARROW IMPLEMENT HAVING A TRANSPORT POSITION IN WHICH THE MAIN FRAME IS UPWARDLY PIVOTED AND THE WING FRAMES ARE FORWARDLY PIVOTED

[75] Inventors: Loren G. Arnold, Tucson, Ariz.; David R. Smith, Fort Jennings, Ohio

[73] Assignee: Unverferth Manufacturing Co., Inc., Kalida, Ohio

[21] Appl. No.: 833,223

[22] Filed: Apr. 14, 1997

Related U.S. Application Data

[63] Continuation of Ser. No. 613,722, Mar. 12, 1996, abandoned.

[51] Int. Cl.⁶ ........................................ A01B 63/00
[52] U.S. Cl. ...................... 172/456; 172/311; 172/457; 172/458
[58] Field of Search ........................ 172/456, 310, 172/311, 457, 458, 315, 316; 111/52, 53, 55, 54, 57; 280/412, 413

[56] References Cited

U.S. PATENT DOCUMENTS

| | | |
|---|---|---|
| 3,568,777 | 3/1971 | Hook . |
| 3,640,345 | 2/1972 | Sosalla . |
| 3,698,488 | 10/1972 | Yoder et al. . |
| 3,700,040 | 10/1972 | Sosalla et al. . |
| 3,708,019 | 1/1973 | Ryan . |
| 3,721,461 | 3/1973 | Nelsen et al. . |
| 3,731,747 | 5/1973 | Frank . |
| 3,732,932 | 5/1973 | Taube . |
| 3,736,988 | 6/1973 | Cantral et al. . |
| 3,749,035 | 7/1973 | Cayton et al. . |
| 3,757,871 | 9/1973 | Maust, Jr. et al. . |
| 3,797,580 | 3/1974 | Roth . |
| 3,896,882 | 7/1975 | Frank . |
| 3,948,327 | 4/1976 | Parker et al. . |
| 3,954,144 | 5/1976 | Blair . |
| 3,967,684 | 7/1976 | Haverdink . |
| 4,030,551 | 6/1977 | Boetto et al. . |
| 4,042,044 | 8/1977 | Honnold . |
| 4,056,149 | 11/1977 | Honnold . |
| 4,088,346 | 5/1978 | Schreiner et al. . |
| 4,098,347 | 7/1978 | Honnold . |
| 4,117,893 | 10/1978 | Kinzebaw . |
| 4,126,187 | 11/1978 | Schreiner et al. . |
| 4,128,131 | 12/1978 | Bucher et al. . |
| 4,137,852 | 2/1979 | Pratt . |
| 4,151,886 | 5/1979 | Boetto et al. ........................ 172/311 |
| 4,171,022 | 10/1979 | Applequist .......................... 172/311 |
| 4,171,726 | 10/1979 | Ward . |
| 4,223,743 | 9/1980 | Garrison . |
| 4,260,172 | 4/1981 | Rettig et al. . |
| 4,299,292 | 11/1981 | Hughes ............................... 172/311 |

(List continued on next page.)

OTHER PUBLICATIONS

Great Plains Folding Drill Brochure, Jan. 1980.

*Primary Examiner*—Michael J. Carone
*Assistant Examiner*—Victor Batson
*Attorney, Agent, or Firm*—Rothwell, Figg, Ernst & Kurz, p.c.

[57] ABSTRACT

A folding frame assembly is provided for supporting soil-cultivating equipment. The folding frame supports the soil-cultivators in a working position in which each cultivator is in contact with the field surface and a transport position in which each cultivator is not touching the field surface and the main wheels support most of the weight of the folding frame. The main wheels are retractable and can be moved from the transport position to an intermediate position for working the field surface. The folding frame assembly includes a support frame, a main frame, and two wing frames. The wing frames are pivotally connected to the main frame and the main frame is pivotally connected to the support frame. Hydraulic cylinders can be used to fold the wing frames and the main frames to their respective positions to that the folding frame assembly is in the transport position or unfold the main and wing frames so that the folding frame assembly is in the working position.

15 Claims, 4 Drawing Sheets

U.S. PATENT DOCUMENTS

| | | |
|---|---|---|
| 4,311,104 | 1/1982 | Steilen et al. . |
| 4,314,610 | 2/1982 | Riewerts et al. . |
| 4,316,511 | 2/1982 | Anderson . |
| 4,319,643 | 3/1982 | Carter et al. . |
| 4,324,296 | 4/1982 | Schenk et al. . |
| 4,355,690 | 10/1982 | Jensen et al. . |
| 4,399,875 | 8/1983 | Schaaf et al. . |
| 4,402,367 | 9/1983 | Couser . |
| 4,415,043 | 11/1983 | Hadler et al. . |
| 4,425,971 | 1/1984 | Allen . |
| 4,444,270 | 4/1984 | van der Lely et al. . |
| 4,504,076 | 3/1985 | Bedney . |
| 4,518,046 | 5/1985 | Rettig et al. . |
| 4,529,040 | 7/1985 | Grollimud . |
| 4,529,043 | 7/1985 | Jensen et al. . |
| 4,563,019 | 1/1986 | Kuhn et al. . |
| 4,576,238 | 3/1986 | Spencer ................... 172/311 |
| 4,582,143 | 4/1986 | Pratt . |
| 4,596,290 | 6/1986 | Bedney . |
| 4,607,708 | 8/1986 | Landphair et al. . |
| 4,630,526 | 12/1986 | Burk et al. . |
| 4,632,417 | 12/1986 | Hodapp . |
| 4,660,651 | 4/1987 | Pfenninger et al. ................... 111/56 X |
| 4,660,654 | 4/1987 | Wiebe et al. . |
| 4,664,202 | 5/1987 | Applequist et al. . |
| 4,690,260 | 9/1987 | Landphair . |
| 4,721,167 | 1/1988 | Salley et al. . |
| 4,723,787 | 2/1988 | Hadler et al. ................... 172/456 X |
| 4,738,317 | 4/1988 | Bedney . |
| 4,813,489 | 3/1989 | Just et al. . |
| 4,821,809 | 4/1989 | Summach et al. . |
| 4,844,173 | 7/1989 | Swartzendruber et al. . |
| 4,867,245 | 9/1989 | Stevens . |
| 4,878,545 | 11/1989 | Dyken ................... 172/456 X |
| 4,893,682 | 1/1990 | Smallacombe . |
| 4,896,732 | 1/1990 | Stark ................... 172/456 X |
| 4,915,014 | 4/1990 | Gilmore et al. . |
| 4,923,017 | 5/1990 | Meek et al. . |
| 4,945,997 | 8/1990 | Adee . |
| 4,967,851 | 11/1990 | Barber . |
| 4,974,684 | 12/1990 | Stevens . |
| 5,024,456 | 6/1991 | Hadley et al. . |
| 5,062,489 | 11/1991 | Adee ................... 172/456 X |
| 5,088,563 | 2/1992 | Shidler ................... 172/456 |
| 5,113,956 | 5/1992 | Friesen et al. ................... 172/456 |
| 5,154,240 | 10/1992 | Carrick . |
| 5,168,936 | 12/1992 | Stevens . |
| 5,232,054 | 8/1993 | Van Blaricon et al. ............ 172/456 X |
| 5,261,497 | 11/1993 | Snyder et al. . |
| 5,291,954 | 3/1994 | Kirwan . |
| 5,346,019 | 9/1994 | Kinzenbaw et al. ................ 172/458 X |
| 5,429,195 | 7/1995 | Turnis . |
| 5,449,042 | 9/1995 | Landphair et al. ................... 172/456 |
| 5,484,025 | 1/1996 | Landphair et al. . |
| 5,488,996 | 2/1996 | Barry et al. ................... 172/456 X |
| 5,535,688 | 7/1996 | Kaufman ................... 111/52 |
| 5,579,849 | 12/1996 | Houck ................... 172/456 X |

## FOLDING FRAME ASSEMBLY FOR A ROLLING HARROW IMPLEMENT HAVING A TRANSPORT POSITION IN WHICH THE MAIN FRAME IS UPWARDLY PIVOTED AND THE WING FRAMES ARE FORWARDLY PIVOTED

This is a continuation of application Ser. No. 08/613,722, filed Mar. 12, 1996, now abandoned.

BACKGROUND OF THE INVENTION

1. Field of Invention

The invention relates generally to frames for supporting agricultural cultivating equipment.

2. Description of Related Art

Mechanized farming is well known in the field of agriculture. Motorized tractors or trucks are generally used to support and operate various types of agricultural cultivating equipment. This equipment is used to cultivate a field surface to prepare it for planting, to harvest crops, to fertilize fields, etc. Generally, the cultivating equipment is mounted on a frame which is then pulled or pushed by tractor. The tractor moves across a field with the cultivating equipment which tills, plows, or cultivates the field surface.

There remains a need in the art for improvements in agricultural equipment.

SUMMARY OF THE INVENTION

In accordance with the present invention, a folding frame assembly includes a support frame, a main frame, a first wing frame, and a second wing frame. The folding frame assembly has a lowered full working position and an upwardly-directed transport position. In the upwardly-directed transport position, the main frame is upwardly-oriented and supported by the support frame and each wing frame is forwardly-oriented and supported by the support frame so that each soil-cultivating assembly is out of contact with the field surface. The support frame also has a main retractable wheel assembly for supporting the full weight of the folding frame when in the transport position. In the lowered full working position, the main wheel assembly is out of contact with the field surface and the main frame, first wing frame, and second wing frame are lowered so that each soil-cultivating assembly is in contact with the field surface.

The main frame, the first wing frame, and the second wing frame carry the soil-cultivating assemblies which can cultivate a field when the folding frame assembly is in the full working position and is moving in a primary direction of travel. The main frame has a front side that is pivotally connected to the back side of the support frame between the full working position and the transport position. The first wing frame is pivotally connected to the first side of the main frame between the full working position and the transport position. Likewise, the second wing frame is pivotally connected to the second side of the main frame between the full working position and the transport position.

The main retractable wheel assembly includes a secondary apparatus for moving the main retractable wheel assembly between an intermediate position and the transport position. In the intermediate position, the main retractable wheel assembly supports the folding frame while the main frame, the first wing frame, and the second wing frame are all in a lowered position. The transport position of the main retractable wheel assembly is forward of the intermediate position so that the main retractable wheel assembly can support the folding frame assembly when it is in the transport position.

DETAILED DESCRIPTION OF THE PREFERRED EMBODIMENTS

Figure 1:
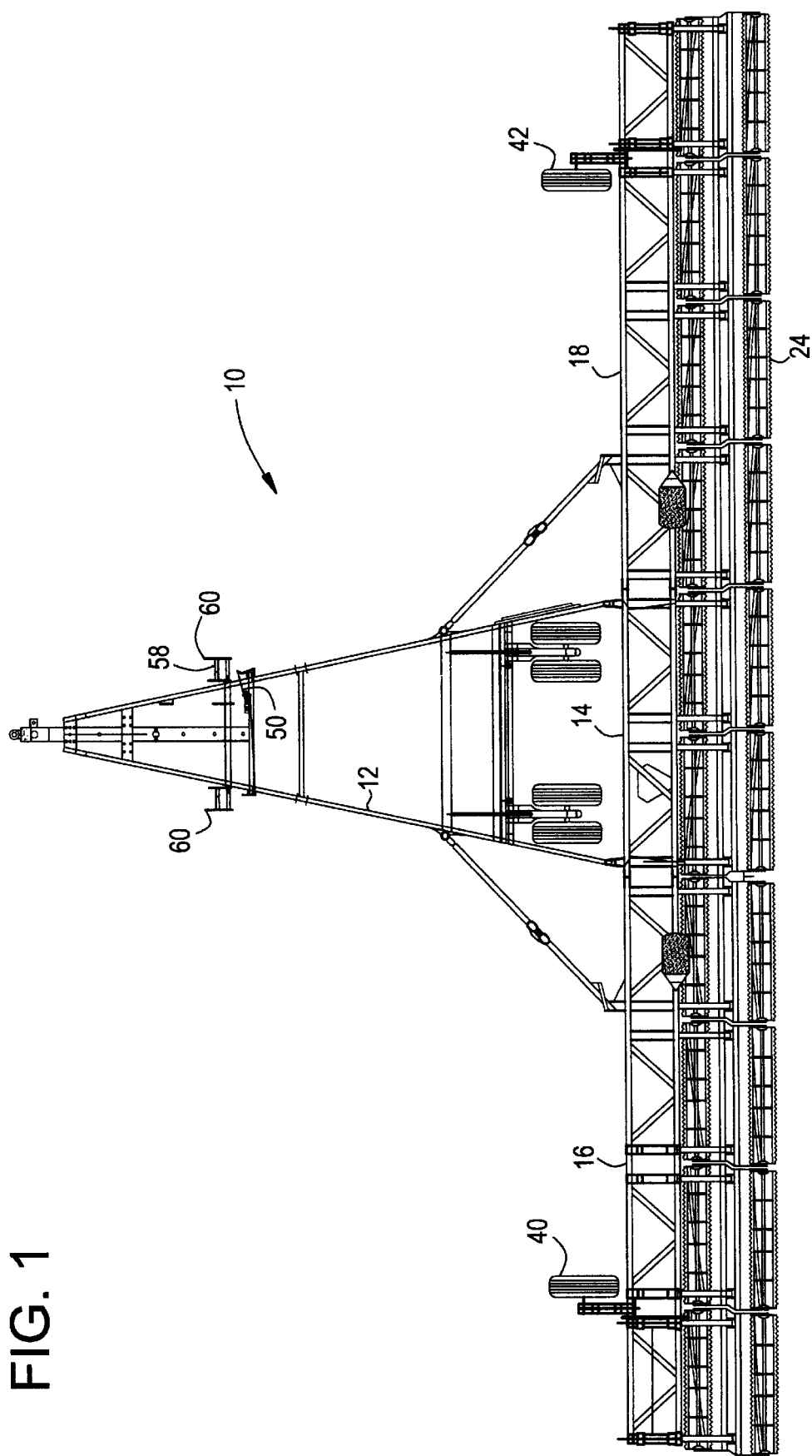
FIG. 1 is a top elevational view of the folding frame assembly in the full working position.
Figure 2:
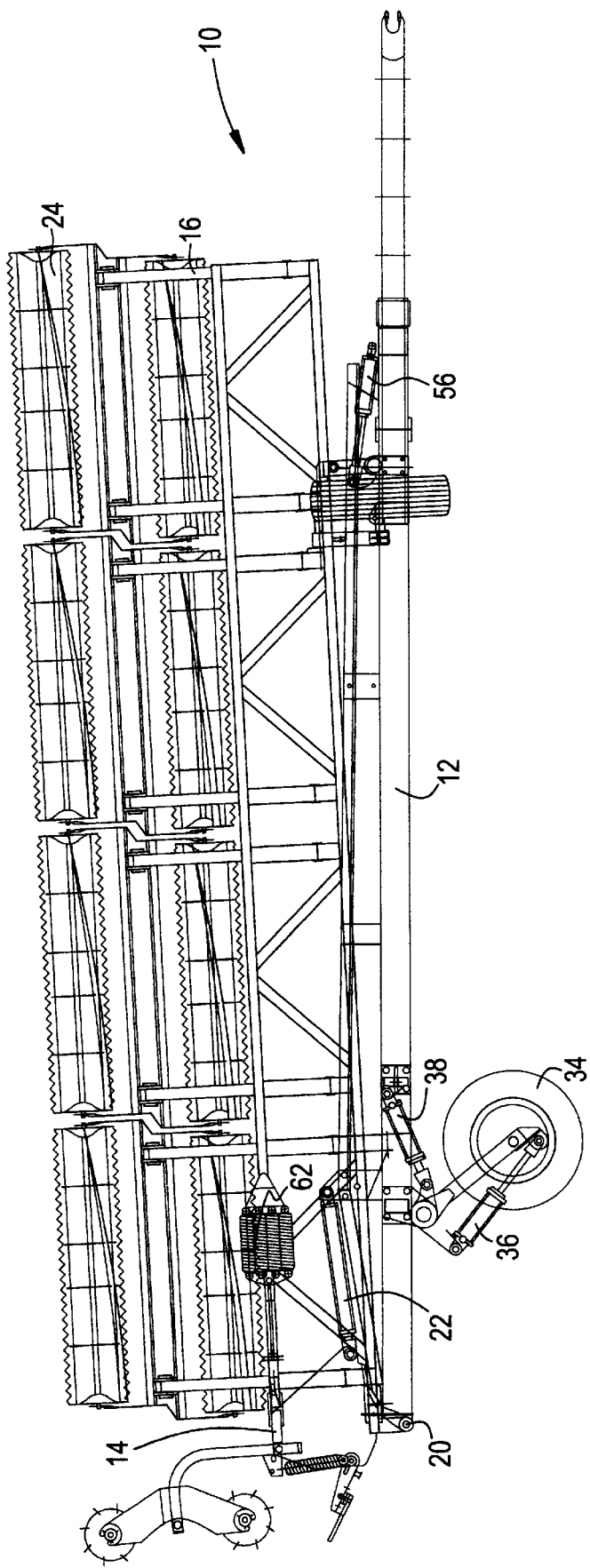
FIG. 2 is a side elevational view of the folding frame assembly shown in FIG. 1 in the transport position.

Referring to FIG. 1, there is shown a folding frame assembly indicated generally at 10. The folding frame assembly is towed by a motor vehicle (not shown), such as a truck or tractor, and is used to support soil-cultivating equipment for cultivating fields and transporting the equipment. The folding frame 10 includes a support frame 12, a main frame 14, a first wing frame 16, and a second wing frame 18. In the preferred embodiment, the main frame 14, the first wing frame 16, and the second wing frame 18 each are provided with a soil-cultivating assembly 24 which can be a set of rolling harrows or another type of cultivating equipment. The main frame 14 has a front side for pivotally connecting to the back side of the support frame 12 with a hinge 20. See FIG. 2. A pair of main hydraulic cylinder units 22, which may be powered and controlled by the tractor (not shown), connect the main frame 14 to the support frame 12 so the main frame 14 can be pivoted from a lowered position in which the soil-cultivating assembly 24 is in contact with the field surface to an upwardly-oriented position in which the soil-cultivating assembly 24 is not in contact with the field surface. In the upwardly-oriented position, the weight of the main frame 14 rests entirely upon the support frame 12.

Figure 3:
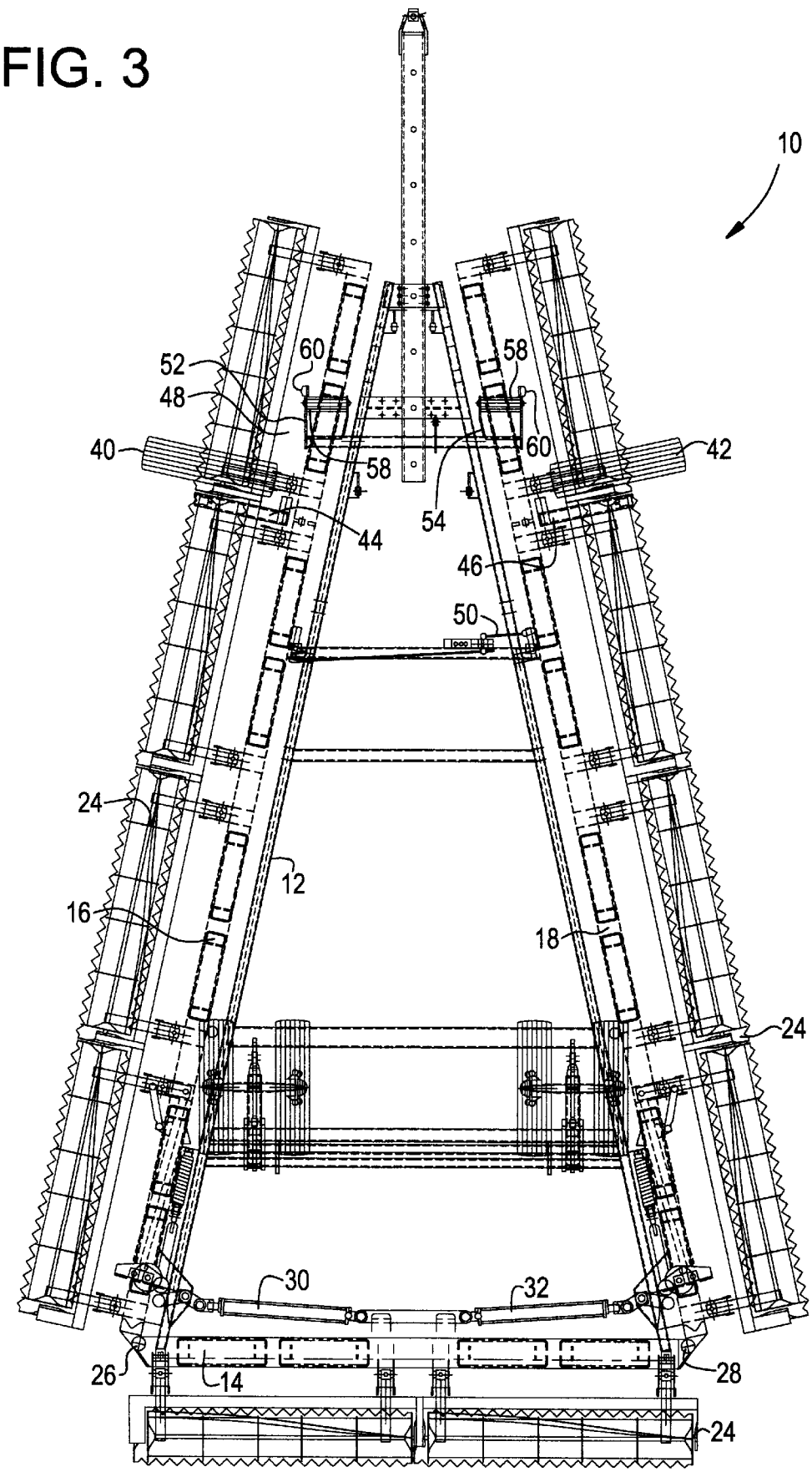
FIG. 3 is a top elevational view of the folding frame assembly shown in FIG. 1 in the transport position.

The first wing frame 16 is pivotally connected to the first side of the main frame 14 with a hinge 26 and the second wing frame 18 is pivotally connected to the main frame 14 with a hinge 28. See FIG. 3.

In the embodiment shown, a first hydraulic cylinder unit 30, which may be powered and controlled by the tractor, connects the main frame 14 to the first wing frame 16 so that the first wing frame 16 can be pivoted to make an acute angle with the main frame 14 when the main frame 14 is in the upwardly-oriented position. This puts the first wing frame 16 in a forwardly-oriented position.

A second hydraulic cylinder unit 32, which may be powered and controlled by the tractor, connects the main frame 14 to the second wing frame 18 so that the second wing frame 18 can be pivoted to make an acute angle with the main frame 14 when the main frame 14 is in the upwardly-oriented position. This puts the second wing frame 18 in a forwardly-oriented position.

The first wing frame 16 and the second wing frame 18 each include a soil-cultivating assembly 24. When the main frame 14, first wing frame 16, and the second wing frame 18 are fully lowered, the soil-cultivating assembly 24 of each frame is in a lowered full working position and in working contact with the field surface.

In preferred embodiments, the main 22, first 30, and second 32 hydraulic cylinder units operate hydraulically in parallel. The main frame 14 supports the first wing frame 16 and the second wing frame 18, so that when the main hydraulic cylinder units 22 start to pivot the main frame 14 to the upwardly-oriented position, the first wing frame 16 and second wing frame 18 pivot upwardly in conjunction with movement of the main frame 14. During this operation, the pressure required to operate the first hydraulic cylinder unit 30 and the second hydraulic cylinder unit 32 is greater than the force required to operate the main cylinder units 22, so that the main frame 14, the first wing frame 16 and the second wing frame 18 pivot in unison toward the upwardly-oriented position of the main frame 14. As the main frame 14 nears its upwardly-oriented position, the force required to pivot the first wing frame 16 and the second wing frame 18 is reduced so that the first hydraulic cylinder unit 30 and the second hydraulic cylinder unit 32 move the first wing frame 16 and the second wing frame 18 into their forwardly-oriented positions.

When the folding of the frame assembly is complete, and the folding frame 10 is in the upwardly-directed transport position, the weight of the upwardly-oriented main frame 14, the weight of the forwardly-oriented first wing frame 16, and the weight of the forwardly-oriented second wing frame 18 are entirely supported by the support frame 12.

When the folding frame 10 is in the upwardly-directed transport position, the first wing frame 16 and the second wing frame 18 are in the forwardly-oriented position and, in preferred embodiments, are locked into place by a locking device 48. See FIG. 3. In the embodiment shown, the locking device 48 includes a detector 50, a first locking frame 52, a second locking frame 54, and a hydraulic cylinder 56. See FIG. 2.

The detector 50 detects when the first wing frame 16 and the second wing frame 18 are in the transport position and activates the hydraulic cylinder 56.

The first locking frame 52 and second locking frame 54 are pivotally connected to the support frame 12 and are controlled by the hydraulic cylinder 56, and both include a roller support surface 58 and a stop 60.

When the hydraulic cylinder 56 is activated by the detector 50, the cylinder 56 pivots the first locking frame 52 and the second locking frame 54 from a down position to an up position. The first wing frame 16 then rests on the roller support surface 58 of the first locking frame 52 and is prevented from sliding off by the stop 60. At the same time, the second wing frame 18 rests on the roller support surface 58 of the second locking frame 54 and is prevented from sliding off by the stop 60.

In the embodiment shown, when the folding frame 10 is in the upwardly-directed transport position, a pair of main retractable wheel assemblies 34, which are pivotally connected to the support frame 12, support most of the weight of the folding frame 10 while the tractor supports the remainder of the weight. See FIG. 2.

Each main retractable wheel assembly 34 includes a first hydraulic cylinder unit 36 and a second hydraulic cylinder unit 38. The first hydraulic cylinder unit 36 extends or retracts the main retractable wheel assembly 34 while the second hydraulic cylinder unit 38 moves the main retractable wheel assembly 34 between an intermediate position and a transport position forward of the intermediate position. In the transport position, each main retractable wheel assembly 34 is close to the center of balance of folding frame 10 so that most of the weight of folding frame 10 rests on the main retractable wheel assemblies 34 and not on the tractor.

In the embodiment shown, the first wing frame 16 has a first retractable wheel assembly 40 with a hydraulic cylinder unit 44 for extending and retracting the first retractable wheel assembly 40. See FIG. 3.

The second wing frame 18 has a second retractable wheel assembly 42 with a hydraulic cylinder unit 46 for extending and retracting the second retractable wheel assembly 42.

In the intermediate position, each main retractable wheel assembly 34 is in line with the first retractable wheel assembly 40 of the first wing frame 16 and the second retractable wheel assembly 18 of the second wing frame 42 and all wheel assemblies touch the field surface. See FIG. 1.

When the folding frame 10 is in the lowered full working position, the soil-cultivating assemblies 24 can be lifted or lowered into or out of contact with the field surface simultaneously. This occurs with the same amount of force on each soil-cultivating assembly 24, with each main retractable wheel assembly 34, the first retractable wheel assembly 40, and the second retractable wheel assembly 42 operating hydraulically in parallel, and substantially in a line perpendicular to the primary direction of travel.

Figure 4:
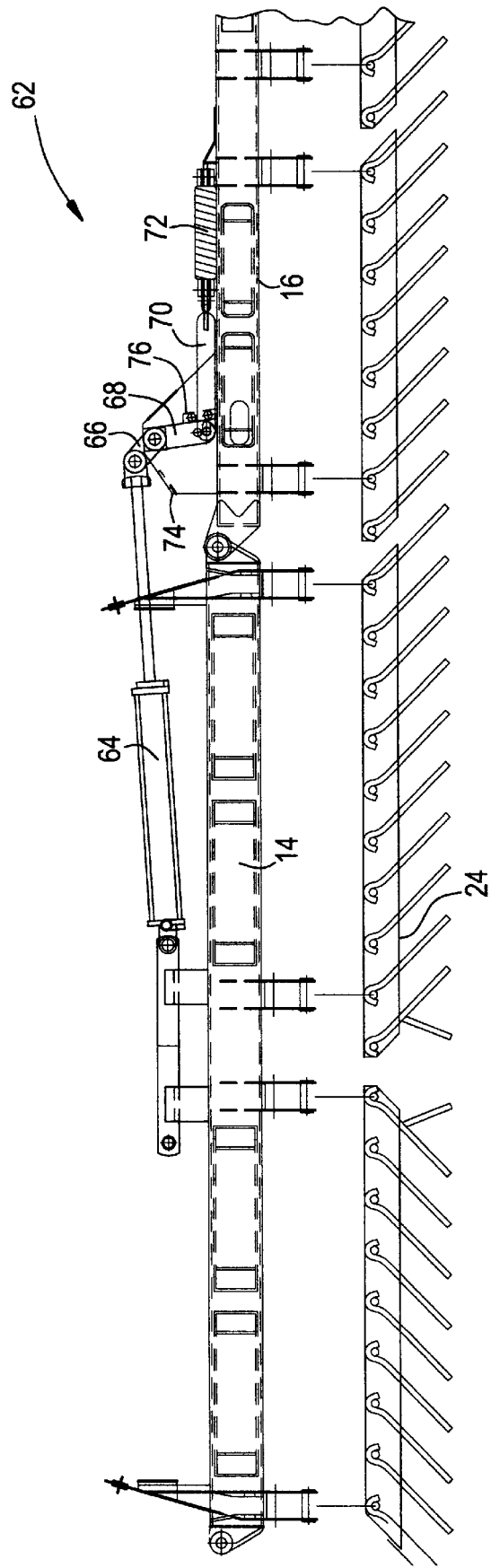
FIG. 4 is a detail of the weight distribution system of the folding frame shown in FIG. 1.

When the folding frame 10 is in the lowered full working position and the main retractable wheel assembly 34 is not touching the ground, the main frame 14 supports some of the weight of the support frame 12. This can cause the weight pushing down on the soil-cultivating assembly 24 on the main frame 14 to be greater than the weight on the soil-cultivating assembly 24 on the first wing frame 16 and the second wing frame 18, which may result in uneven field cultivation. To remedy this, in a preferred embodiment, a weight distribution system 62 is used between the main frame 14 and the first wing frame 16 and between the main frame 14 and the second wing frame 18. See FIG. 4. The weight distribution system 62 creates moments so that the extra weight of the support frame 12 is distributed substantially evenly between the main frame 14, the first wing frame 16, and the second wing frame 18.

In the embodiment shown, the weight distribution system 62 includes hydraulic cylinder 64 (which may be the same hydraulic cylinder used to fold the first or second wing frames), a top link 66, a bottom link 68, a connecting link 70, and a spring assembly 72.

The hydraulic cylinder 64 is secured at its stationary end to the main frame 14 and at its moving end to the first wing frame 16 through a pivoting link 66 mounted in assembly 74. This allows the hydraulic cylinder 64 to act as the folding cylinder for the first wing frame 16 when the hydraulic cylinder 64 is retracting, and allows the hydraulic cylinder 64 to act as a force for creating a moment between the main frame 14 and the first wing frame 16 when the hydraulic cylinder 64 is extending.

The top link 66 connects the moving end of the hydraulic cylinder 64 through a pivoting point to the bottom link 68.

The bottom link 68 is connected to the connecting link 70, which is in turn connected to the spring assembly 72 mounted on the first wing frame 16.

The hydraulic cylinder 64 extends, pushing the top link 66, which pivots the bottom link 68, which in turn pulls the connecting link 70, engaging the spring assembly 72. This directs a force between the main frame 14 and the first wing frame 16. This force is equal to the tension in the spring assembly 72. The force can be adjusted by providing springs with different coefficients of elasticity.

When the hydraulic cylinder 64 retracts, the top link 66 is pulled and causes the bottom link 68 to pivot. The bottom link 68 then engages the stop 76, which is located on the pivoting assembly 74. The hydraulic cylinder 64 can thus be used to fold the first wing frame 16 to the forwardly-oriented position.

Many modifications, variations, and changes in detail may be made to the described embodiment, and it is intended that the matter in the foregoing description and shown in the accompanying drawings be interpreted as illustrative and not in a limiting sense.

What is claimed is:

1. A folding frame assembly for soil-cultivating equipment used in cultivating a field surface when moving in a primary direction of travel, the folding frame assembly having a weight, a lowered full working position and an upwardly-directed fully folded transport position, the folding frame assembly comprising:

a support frame having a back side, and a main retractable wheel assembly;

a main frame for carrying a soil-cultivating assembly, and having a front side, a first side, and a second side, the first side being opposite the second side and the front side being pivotally connected to the back side of the support frame for pivoting the main frame between said full working position and said fully folded transport position;

a first wing frame for carrying a first wing soil-cultivating assembly, and pivotally connected to the first side of the main frame for pivoting the first wing frame between said full working position and said fully folded transport position;

a second wing frame for carrying a second wing soil-cultivating assembly, and pivotally connected to the second side of the main frame for pivoting the second wing frame between said full working position and said fully folded transport position;

wherein, in said fully folded transport position, the main retractable wheel assembly is positioned in contact with said field surface, the main frame is upwardly pivoted relative to said support frame and supported by the support frame, and the first wing frame and second wing frame are each forwardly oriented and supported by said support frame so that each said soil-cultivating assembly is out-of-contact with said field surface;

wherein, in said full working position, said main wheel assembly is retracted out of contact with said field surface, the main frame is downwardly pivoted relative to said support frame to a lowered position, and the first wing frame and second wing frame are each in a lowered position, so that each said soil-cultivating assembly is in contact with said field surface;

wherein the main retractable wheel assembly further comprises a secondary apparatus connecting the main retractable wheel assembly and the main frame, the secondary apparatus acting between the retractable wheel assembly and the main frame for moving the main retractable wheel assembly between said full working position and said fully folded transport position, wherein, in said fully folded transport position, the main retractable wheel assembly is positioned proximate a center of balance of the folding frame assembly and forwardly of said full working position so as to support most of the weight of said folding frame assembly on said main retractable wheel assembly during transport:

wherein the first wing frame includes a first retractable wheel assembly;:

the second wing frame includes a second retractable wheel assembly;

the main retractable wheel assembly further comprises a main lift apparatus connecting the main retractable wheel assembly to the main frame;

the first retractable wheel assembly further comprises a first lift apparatus connecting the first retractable wheel assembly to the first wing frame; and the second retractable wheel assembly further comprises a second lift apparatus connecting the second retraction wheel assembly to the second wing frame;

wherein the main lift apparatus, the first lift apparatus, and the second lift apparatus, respectively, operate to vertically adjust the main frame, the first wing frame, and the second wing frame with respect to the field surface between said full working position wherein each said wheel assembly is out-of-contact with said field surface, and an intermediate position wherein each said wheel assembly is in contact with said field surface;

wherein the main frame further comprises a first wing pivoting apparatus connected to the first wing frame for pivoting the first wing frame between the full working position and the fully folded transport position, and a second wing pivoting apparatus connected to the second wing frame for pivoting the second wing frame between the full working position and the fully folded transport position, wherein the first and second wing frames are upwardly-oriented relative to said support frame in said fully folded transport position;

wherein the support frame further comprises a main folding apparatus connected to the main frame for pivoting the main frame between the full working position and said fully folded transport position;

wherein each said apparatus is a hydraulic cylinder.

2. The folding frame assembly of claim 1, wherein in said intermediate position, the main retractable wheel assembly, the first retractable wheel assembly, and the second retractable wheel assembly are substantially in a line perpendicular to the primary direction of travel.

3. The folding frame assembly of claim 2, wherein in said intermediate position, each said soil-cultivating assembly is out-of-contact with said field surface.

4. The folding frame assembly of claim 1, wherein the main folding apparatus, the first wing pivoting apparatus, and the second wing pivoting apparatus operate hydraulically in parallel.

5. The folding frame assembly of claim 4, wherein the support frame further comprises a locking device for locking the first and second wing frames into said transport position.

6. The folding frame assembly of claim 5, wherein the locking device comprises:

a detector for detecting when the first and second wing frames are in said fully folded transport position;

a first locking frame and a second locking frame pivotally connected to the support frame between an up position and a down position;

a locking frame-pivoting apparatus connected to and responsive to said detector for pivoting the first locking frame and the second locking frame simultaneously between the up position and the down position;

the first locking frame having a first roller and a first retaining member, the first roller supporting the first wing frame and the first retaining member holding the first wing frame onto the first roller; and the second locking frame having a second roller and a second retaining member, the second roller supporting the second wing frame and the second retaining member holding the second wing frame onto the second roller.

7. The folding frame assembly of claim 6, wherein said locking frame pivoting apparatus is a hydraulic cylinder.

8. The folding frame assembly of claim 1, wherein the main frame has a weight, and wherein the folding frame assembly further comprises a weight distribution system connecting the main frame and the first and second wing frames for distributing a portion of the weight of the main frame in substantially equal amounts to the first wing frame and the second wing frame in said full working position so as to substantially equalize pressure applied by each said soil-cultivating assembly against said field surface in said full working position.

9. The folding frame assembly of claim 8, wherein the weight distribution system comprises:

a first cylinder having a first stationary end and a first moving end, and connected to the main frame at the first stationary end;

a first pivoting assembly attached to the first wing frame and having a first top link, connected to the first moving end, and a first bottom link connected to the first top link;

a first spring assembly attached to the first wing frame;

a first connecting link attached to the first spring assembly and the first bottom link, so that the first cylinder pushes the first top link causing the first top link and first bottom link to pivot and the first bottom link pulls the first connecting link which pulls the first spring assembly so that the spring assembly is stretched which causes an equal but opposite force perpendicular to the field surface to be applied to the main frame and the first wing frame;

a second cylinder having a second stationary end and a second moving end, and connected to the main frame at the second stationary end;

a second pivoting assembly attached to the second wing frame and having a second top link, connected to the second moving end, and a second bottom link connected to the second top link;

a second spring assembly attached to the second wing frame; and a second connecting link attached to the second spring assembly and the second bottom link, so that the second cylinder pushes the second top link causing the second top link and second bottom link to pivot and the second bottom link pulls the second connecting link which pulls the second spring assembly so that the spring assembly is stretched which causes an equal but opposite force perpendicular to the field surface to be applied to the main frame and the second wing frame.

10. The folding frame assembly of claim 2, wherein the support frame further comprises a main folding apparatus connected to the main frame for pivoting the main frame between said full working position and said fully folded transport position.

11. The folding frame assembly of claim 10, wherein the support frame further comprises a locking device for locking the first and second wing frames into said fully folded transport position.

12. The folding frame assembly of claim 11, wherein the locking device comprises:

a detector for detecting when the first and second wing frames are in said fully folded transport position;

a first locking frame and a second locking frame pivotally connected to the support frame between an up position and a down position;

a locking frame-pivoting apparatus connected to and responsive to said detector for pivoting the first locking frame and the second locking frame simultaneously between the up position and the down position;

the first locking frame having a first roller and a first retaining member, the first roller supporting the first wing frame and the first retaining member holding the first wing frame onto the first roller; and the second locking frame having a second roller and a second retaining member, the second roller supporting the second wing frame and the second retaining member holding the second wing frame onto the second roller.

13. The folding frame assembly of claim 12, wherein each said apparatus is a hydraulic cylinder, and wherein the main folding cylinder, the first wing cylinder, and the second wing cylinder operate hydraulically in parallel.

14. The folding frame assembly of claim 13, wherein the main frame has a weight, and wherein the folding frame assembly further comprises a weight distribution system connecting the main frame and the first and second wing frames for distributing a portion of the weight of the main frame in substantially equal amounts to the first wing frame and the second wing frame in said full working position so as to substantially equalize pressure applied by each said soil-cultivating assembly against said field surface in said full working position.

15. The folding frame assembly of claim 14, wherein the weight distribution system comprises:

a first cylinder having a first stationary end and a first moving end, and connected to the main frame at the first stationary end;

a first pivoting assembly attached to the first wing frame and having a first top link, connected to the first moving end, and a first bottom link connected to the first top link;

a first spring assembly attached to the first wing frame;

a first connecting link attached to the first spring assembly and the first bottom link, so that the first cylinder pushes the first top link causing the first top link and first bottom link to pivot and the first bottom link pulls the first connecting link which pulls the first spring assembly so that the spring assembly is stretched which causes an equal but opposite force perpendicular to the field surface to be applied to the main frame and the first wing frame;

a second cylinder having a second stationary end and a second moving end, and connected to the main frame at the second stationary end;

a second pivoting assembly attached to the second wing frame and having a second top link, connected to the second moving end, and a second bottom link connected to the second top link;

a second spring assembly attached to the second wing frame; and a second connecting link attached to the second spring assembly and the second bottom link, so that the second cylinder pushes the second top link causing the second top link and second bottom link to pivot and the second bottom link pulls the second connecting link which pulls the second spring assembly so that the spring assembly is stretched which causes an equal but opposite force perpendicular to the field surface to be applied to the main frame and the second wing frame.

* * * * *